(12) United States Patent
Chen

(10) Patent No.: US 6,600,600 B2
(45) Date of Patent: Jul. 29, 2003

(54) PROJECTION SCREEN AND PROJECTION METHOD

(75) Inventor: Shane Chen, Camas, WA (US)

(73) Assignee: CID, Inc., Camas, WA (US)

( * ) Notice: Subject to any disclaimer, the term of this patent is extended or adjusted under 35 U.S.C. 154(b) by 30 days.

(21) Appl. No.: 09/839,802

(22) Filed: Apr. 19, 2001

(65) Prior Publication Data

US 2002/0022940 A1 Feb. 21, 2002

Related U.S. Application Data

(63) Continuation-in-part of application No. 09/638,530, filed on Aug. 14, 2000.

(51) Int. Cl.[7] .................. G03B 21/60; G03B 21/56; G03B 21/14; G02B 3/08; G02B 27/10
(52) U.S. Cl. .................. 359/459; 359/449; 359/455; 359/619; 359/625; 359/628; 359/742; 359/743; 353/79
(58) Field of Search .................. 359/459, 443, 359/457, 742, 743, 449, 455, 619, 625, 628; 353/79

(56) References Cited

U.S. PATENT DOCUMENTS

| | | | |
|---|---|---|---|
| 3,510,197 A | 5/1970 | Takeo Seki et al. | 359/461 |
| 3,580,661 A | 5/1971 | Cooper | 359/457 |
| 3,686,781 A * | 8/1972 | Calhoun, Jr. | 40/437 |
| 3,784,742 A | 1/1974 | Burnham et al. | 348/123 |
| 3,938,876 A * | 2/1976 | Brown | 359/455 |
| 4,089,587 A | 5/1978 | Schudel | 359/451 |
| 4,732,441 A | 3/1988 | Cheng | 359/451 |
| 4,756,603 A | 7/1988 | Ohtani | 359/601 |
| 4,911,529 A | 3/1990 | Van De Ven | 359/454 |
| 5,337,179 A | 8/1994 | Hodges | 359/443 |
| 5,414,558 A | 5/1995 | You | 359/451 |
| 5,456,967 A | 10/1995 | Nezu | 428/141 |
| 5,541,769 A | 7/1996 | Ansley et al. | 359/451 |
| 5,696,625 A | 12/1997 | Malifaud et al. | 359/459 |
| 5,837,346 A | 11/1998 | Langille et al. | 428/141 |
| 6,023,369 A * | 2/2000 | Goto | 359/443 |
| 6,421,174 B1 * | 7/2002 | Ooshima et al. | 359/457 |

* cited by examiner

Primary Examiner—Russell Adams
Assistant Examiner—Magda Cruz
(74) Attorney, Agent, or Firm—Chernoff, Vilhauer, McClung & Stenzel, LLP

(57) ABSTRACT

A reflective projection screen has in a first aspect a plurality of reflective elements. The upper surface of the reflective elements is either coated or textured to interfere with reflection of light from the upper surface to an adjacent reflective element. In a second aspect of the invention, a screen is provided that reflects light in the vertical direction like a plane surface, while reflecting light in the horizontal direction back toward the light source. In a third aspect of the invention, a projection system projects a three-dimensional image.

14 Claims, 17 Drawing Sheets

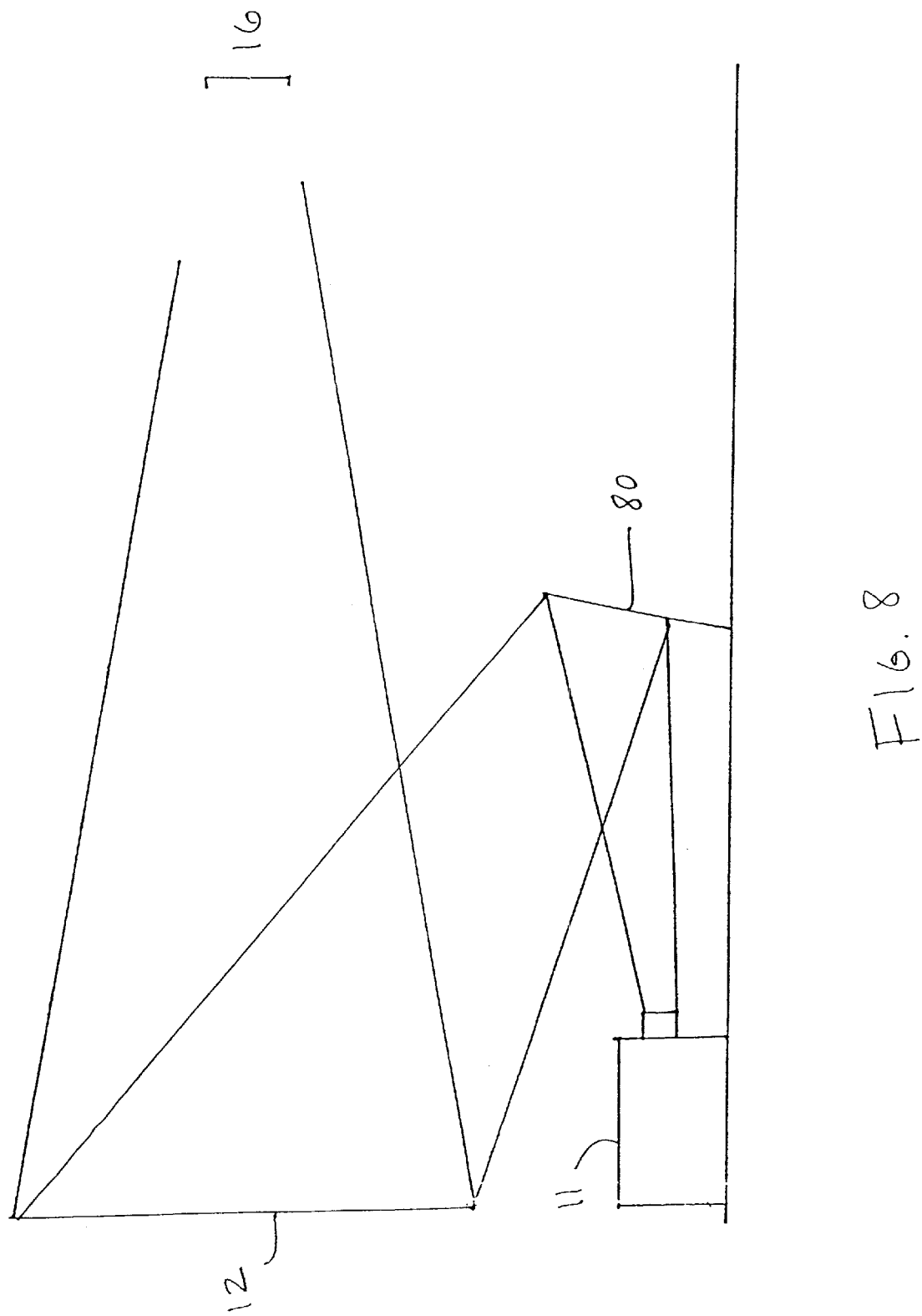

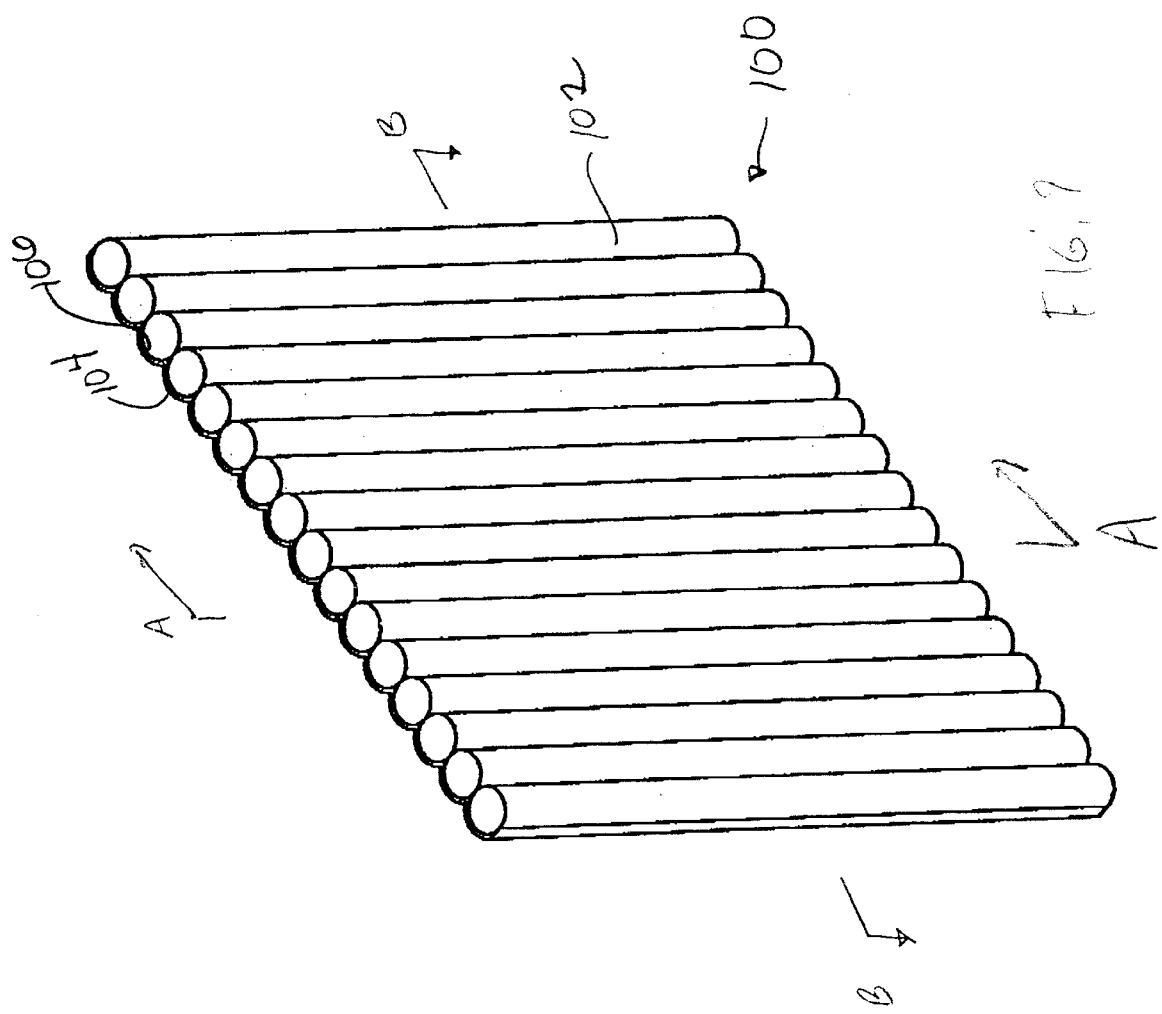

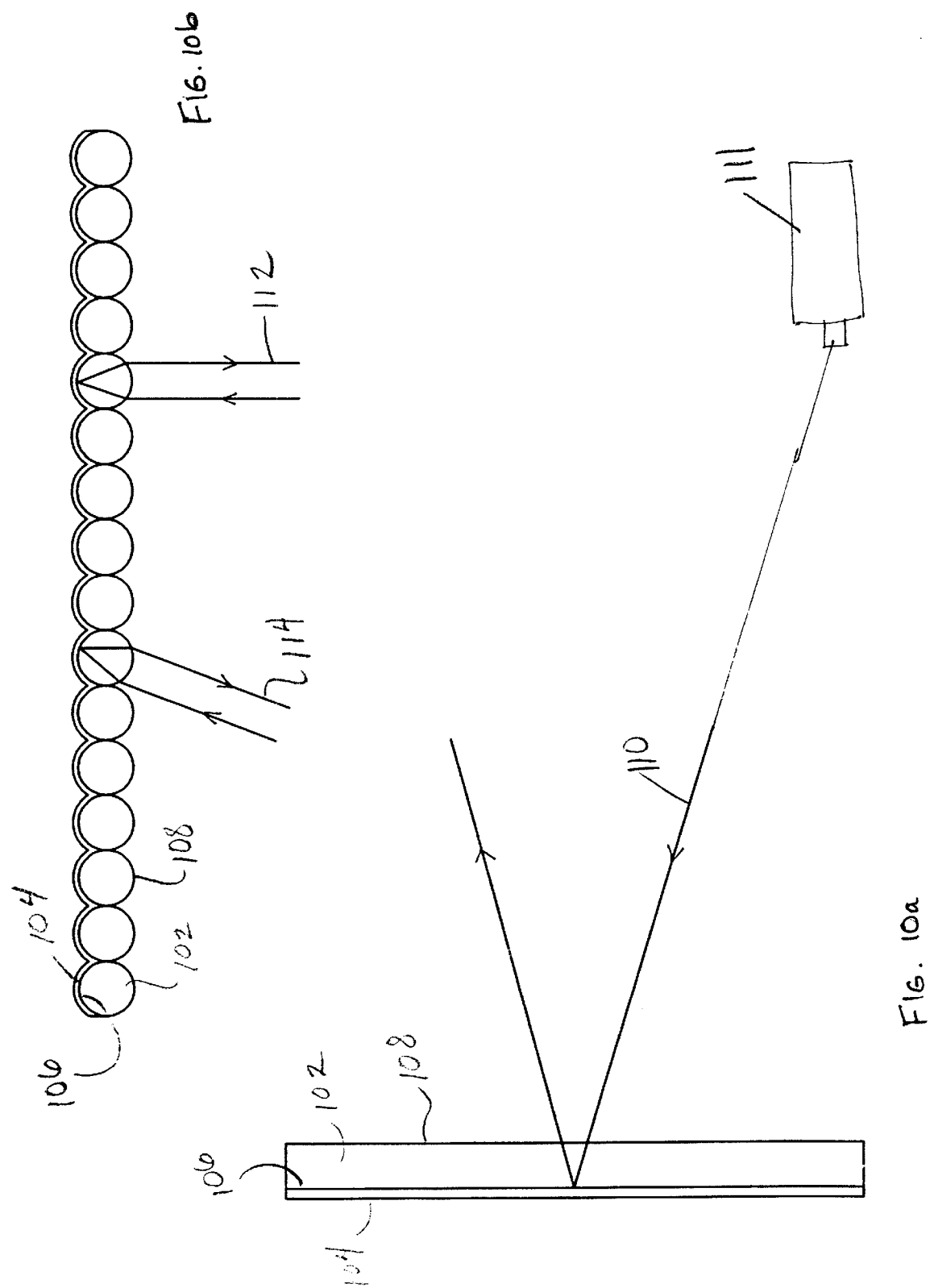

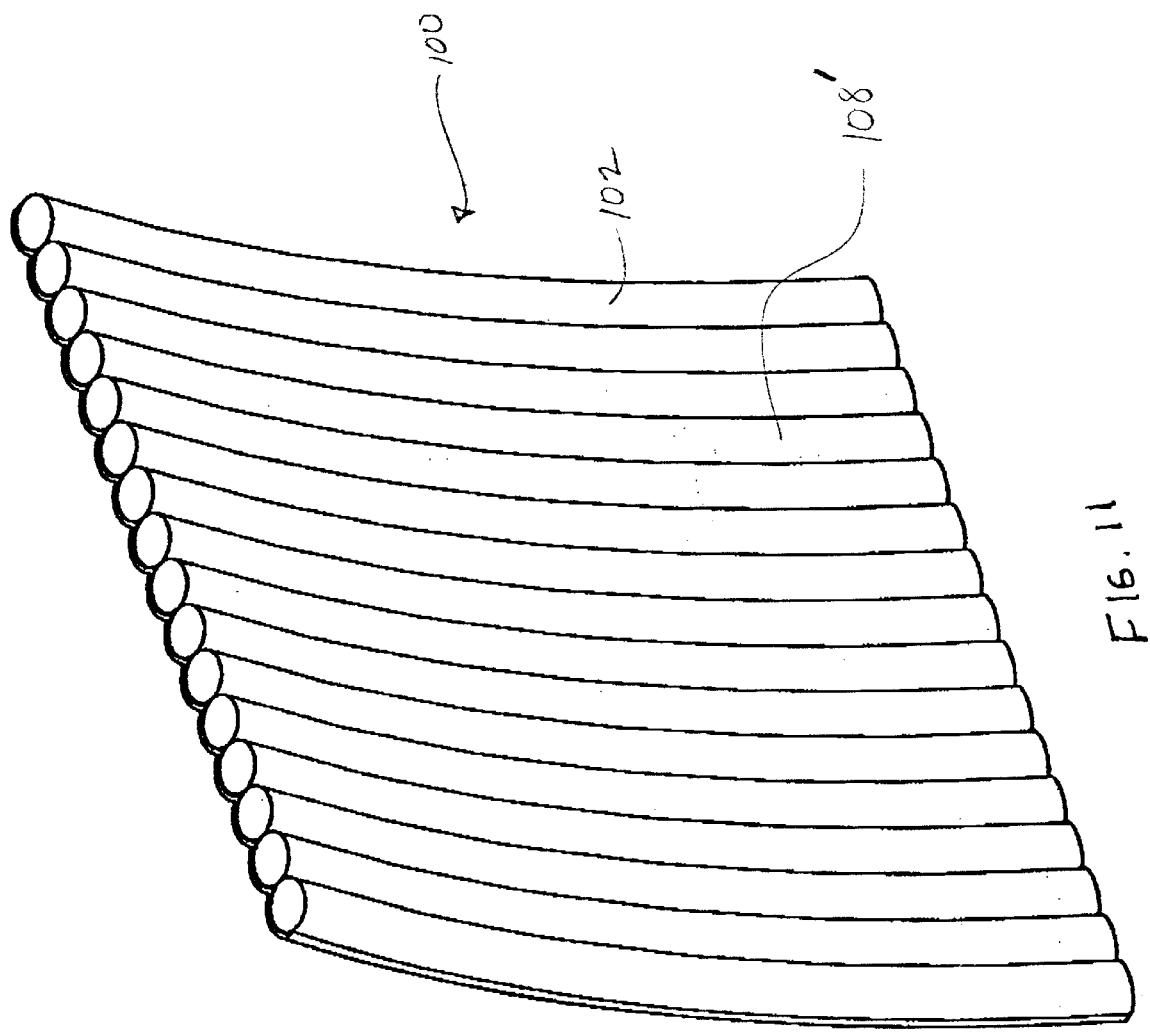

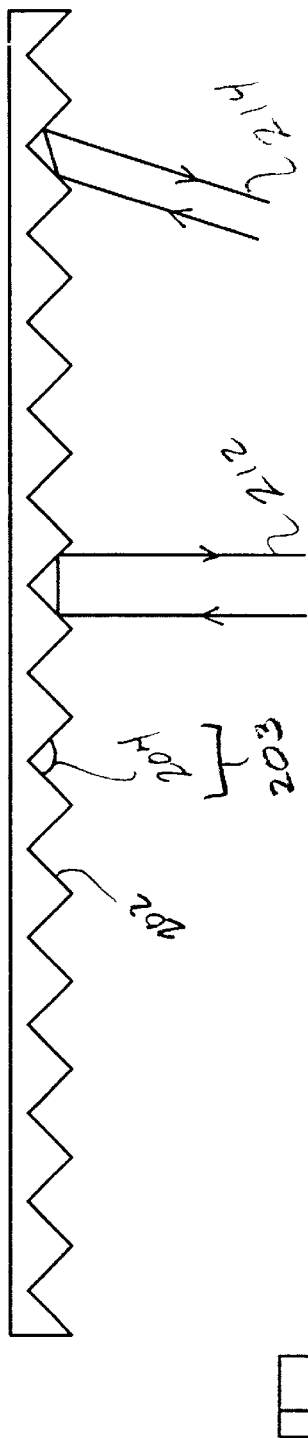
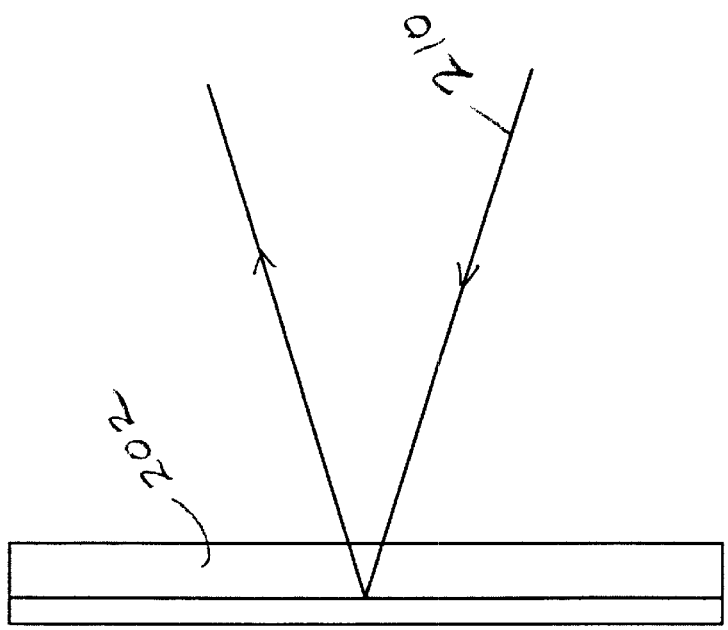
FIG. 14b
FIG. 14a

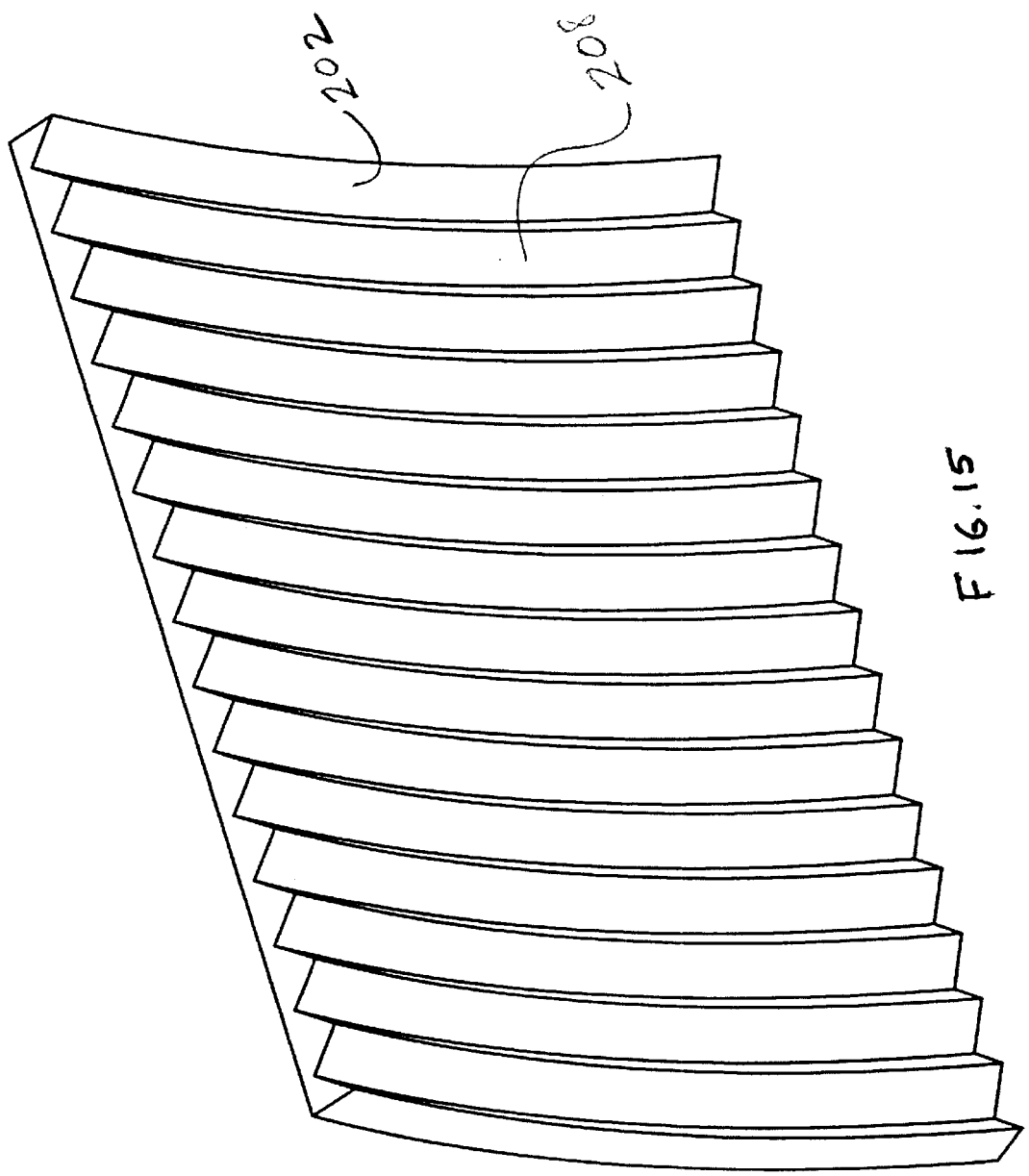

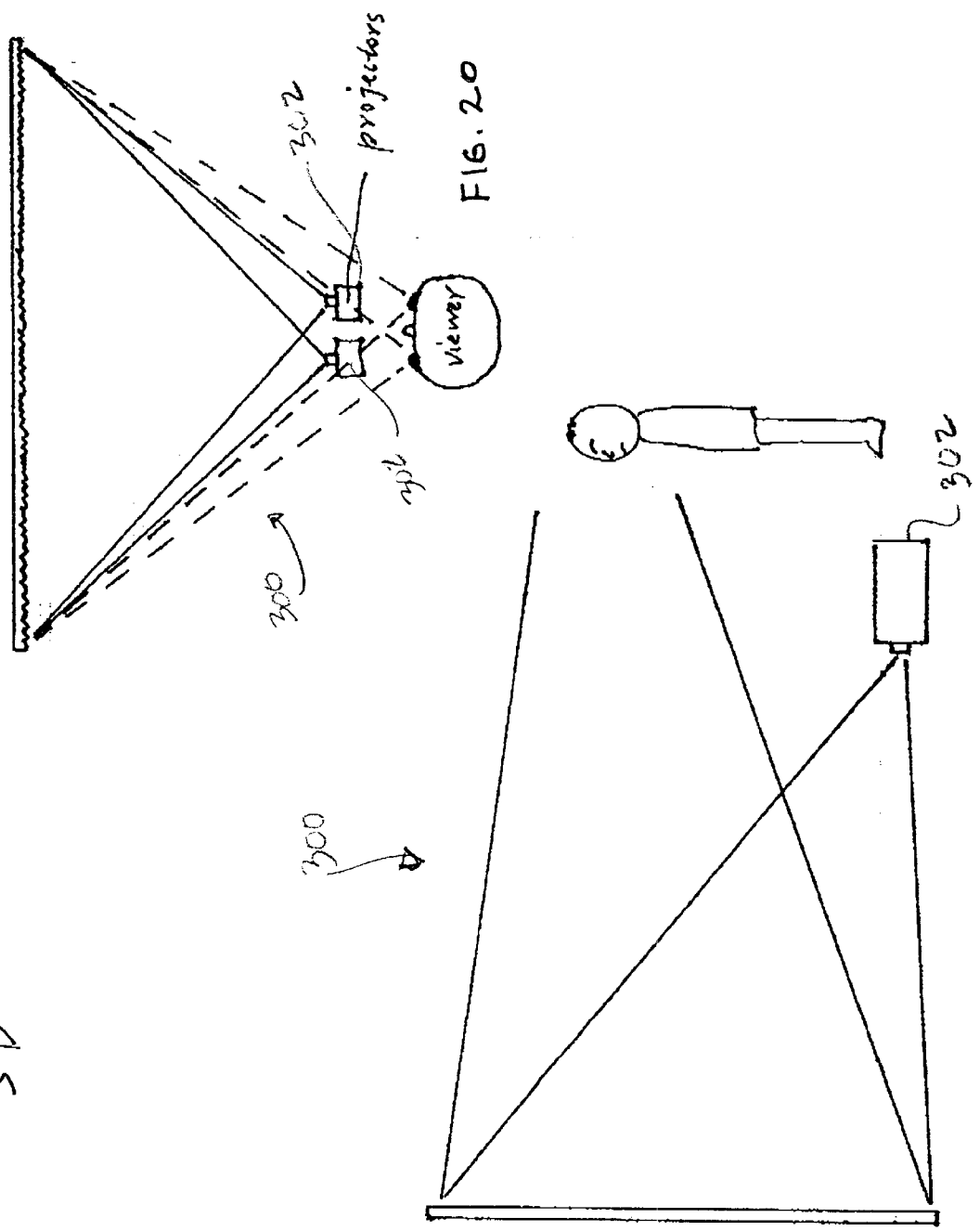

PROJECTION SCREEN AND PROJECTION METHOD

This is a continuation-in-part of pending patent application Ser. No. 09/638,530, filed Aug. 14, 2000, the priority of which is hereby claimed.

BACKGROUND OF THE INVENTION

The present invention relates to a projection screen and a projection system and method and, more particularly, to a front projection screen and a projection method which controls the reflection of light in the horizontal and vertical directions to minimize the effects of ambient light so as to provide a high contrast image.

Projection screens are often used for audio-visual presentations at trade shows and other exhibitions. Viewers at exhibit booths are likely to stand in an arc around the front of the exhibit at some distance from a front projection screen on which images are projected. An effective presentation requires a reflected image of high intensity and good contrast. In many exhibition venues light from overhead lighting impinges on the projection screen, reducing the contrast or "washing out" the projected images. Directing the light of the reflected image in a relatively narrow vertical band increases the intensity in the region of the viewers' eyes. On the other hand, the arrangement of viewers requires that light be reflected over a substantial horizontal angle.

Generally, front projection screens are either reflective, light scattering, or refractive. The surface of light scattering screens scatters the incident light in all directions rather than reflecting it at a discrete angle. Light scattering projection screens provide a wide viewing angle both horizontally and vertically but the gain of the screen is low and images are visible only under dim lighting conditions. Refractive screens are coated with tiny glass balls and light projected at an angle to the screen is returned along the path of incidence. Refractive screens are particularly useful when the projector is positioned low relative to the screen because the light is returned along the path of incidence toward a seated audience. However, glass beaded screens can be delicate and can exhibit a granular appearance because the glass beads are of sufficient size to cause disturbing refraction involving individual picture elements. Further, the luminance provided by a refractive screen decreases substantially from the center to the edges both horizontally and vertically and the homogenous nature of the glass beads does not allow a focusing difference in the horizontal and vertical planes.

Reflective screens have surfaces exhibiting behavior governed primarily by the law of reflection; that is, the angle of incidence of light equals the angle of reflection. This type of screen provides greater gain than is available with light scattering screens and, therefore, better visibility in areas of more intense ambient light. However, the viewing angle of a planar reflective screen is narrower than that of a diffusing screen so the viewer can clearly see images only within a limited arc in front of the screen. Reflective screens commonly have a surface combining reflection and limited diffusion. Light is reflected from this type of surface in a solid angle along the nominal angle of reflection.

The physical arrangement of the projector and screen can be problematic when using front projection in an exhibit. Front projectors are seldom placed normal to the screen because the projector would obstruct the field of view of the audience. A front projector is typically located above the heads of the audience and a reflective screen is used to redirect the light to the eyes of the viewers. However, mounting the projector overhead is often not practical in a trade show or exhibit booth. Positioning the projector low relative to the screen reduces obstruction to viewing the screen, but a screen that reflects the image upward to the eyes of the audience is particularly vulnerable to glare and wash out from overhead lighting.

A front projection screen comprising multiple reflective screen elements arranged in vertical columns is disclosed in Malifaud et al., U.S. Pat. No. 5,696,625. The screen elements have either a toroidal or a cylindrical reflective surface. The curvatures of the reflective surfaces of the individual screen elements can be varied to directionally focus an image. However, focusing the reflected light by altering the curvature of individual screen elements results in a complex screen assembly. Further, the screen is adapted for use in a darkened theater setting with a projector mounted above the screen.

What is desired, therefore, is a front projection screen that provides for directional focusing of an image, protection from glare and wash out by overhead lighting, and permits the projector to be positioned near the bottom of the screen out of the line of sight of viewers.

BRIEF SUMMARY OF THE INVENTION

The present invention overcomes the aforementioned drawbacks of the prior art by providing a projection screen for reflecting an image from a projector to a viewer comprising a screen defining a horizontal direction and a vertical direction and having a top and a bottom.

In a first aspect of the invention, a projection screen comprises a plurality of reflective elements. Each of the elements has an upper surface, and each element has a vertically inclined surface. The upper surface of each element is either coated with a light absorbing material, or is textured to diffuse light. The upper surface thus interferes with reflection of ambient light from the upper surface toward an adjacent vertically inclined surface of an adjacent reflective element.

In a second aspect of the invention, a projection screen is provided that reflects light from a light source in the vertical direction like a planar surface, but reflects light in the horizontal direction back toward the light source. In one embodiment, the screen is comprised of a plurality of vertically oriented light-transmissive rods. The rear surface of the rods is coated with a reflective material. In another embodiment of the invention, the screen is comprised of a plurality of pairs of reflective surfaces, each respective pair forming a generally v-shaped channel.

Each of the screen embodiments directs the ambient light away from the viewer, thereby improving image contrast. The screens of the present invention thus provide high contrast viewing even in bright ambient lighting conditions.

In a third aspect of the invention, a projection system is provided that projects a three-dimensional image.

The foregoing and other objectives, features and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 7b is a detail view of FIG. 7a.

FIG. 8 is an alternative projection system.

FIG. 9 shows yet another embodiment of a projection screen.

FIG. 10a shows a cross-section taken along the line A—A of FIG. 9 to show reflection of light in the vertical direction.

FIG. 10b shows a cross-section taken along the line B—B of FIG. 9 showing reflection of light in the horizontal direction.

FIG. 11 shows another embodiment of a projection screen like that shown in FIG. 9 having a curved inner surface.

FIG. 14a is a cross-section taken along the line A—A of FIG. 13 showing reflection of light in the vertical direction.

FIG. 14b is a cross-section taken along the line B—B of FIG. 13 showing reflection of light in the horizontal direction.

FIG. 15 is a projection screen like that of FIG. 13, but with a curved inner concave surface.

FIG. 16 is yet another projection screen like that of FIG. 13 comprised of a plurality of horizontal row segments.

FIG. 19 is side view of yet another embodiment of the present invention providing three dimensional viewing of an image.

FIG. 20 is a top view of the system of FIG. 19.

DETAILED DESCRIPTION OF THE PREFERRED EMBODIMENT

Figure 1:
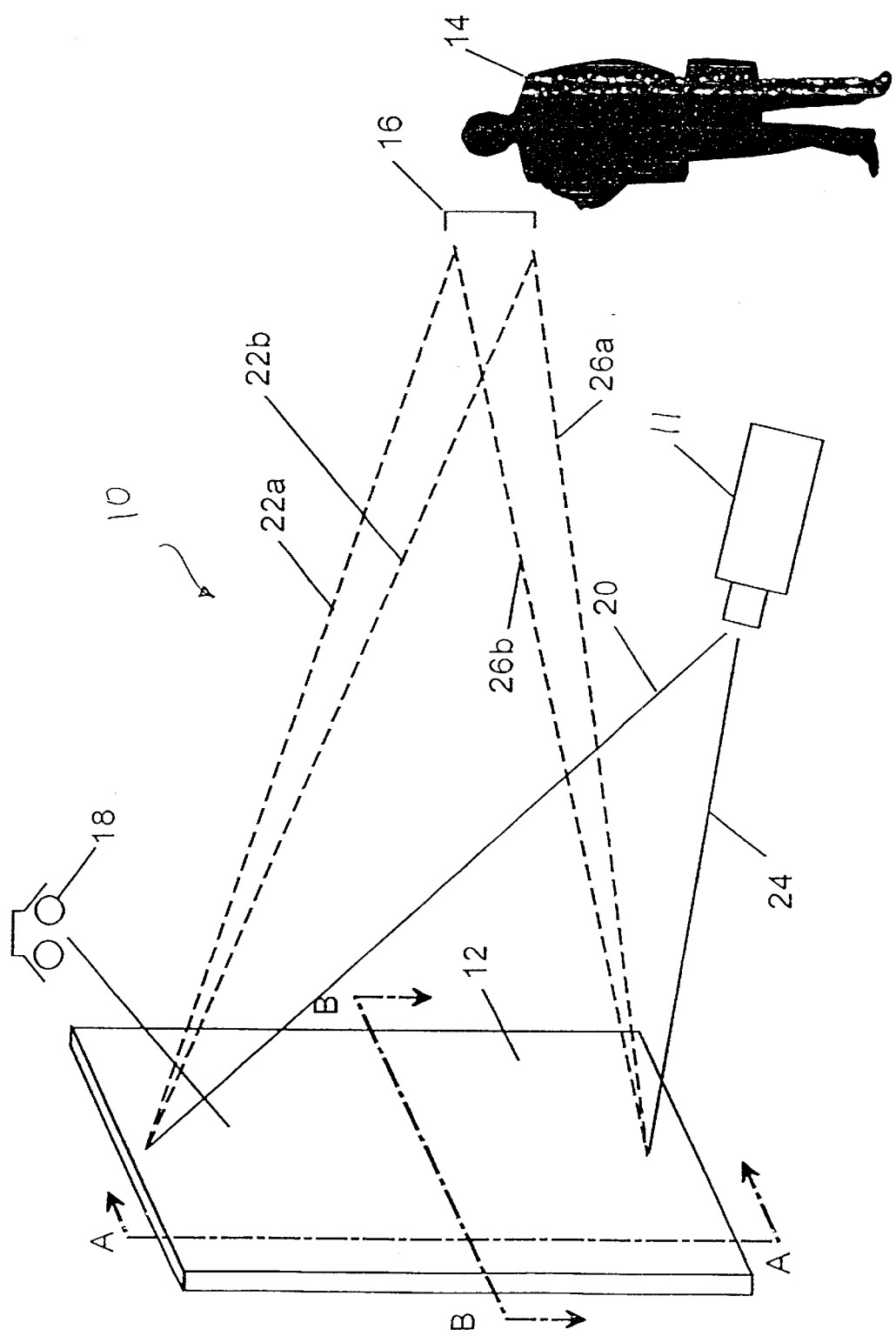
FIG. 1 is a schematic perspective representation of a projection system.

Referring to FIG. 1, in a system 10, a front projection presentation light from a projector 11 is reflected from a projection screen 12 to viewers 14 arrayed in front of the screen. At a typical trade show exhibit booth or conference room, the audience 14 is often sitting or standing and arrayed in a wide horizontal area around the front of the booth. With the audience arrayed in an area around the viewing area, a large horizontal viewing angle is desirable. However, in the vertical plane, the reflected light should be focused in a fairly narrow viewing band 16 (indicated by a bracket) to maximize the intensity of the light in the area of the eyes of the audience 14. On the other hand, the effects of ambient light from sources such as overhead lights 18 should be minimized. Ambient lighting striking the screen reduces the contrast and can "wash out" the projected image. In many venues overhead lighting 18 is the principal source of ambient light. Nevertheless, other sources of ambient lighting, such as from windows in a conference room, should also be minimized.

The present inventor realized that a projection screen comprising a plurality of horizontal row segments permitting horizontal distribution of the light over a wide area and narrow distribution of the light in a vertical direction could be used with a projector located below the center line of the screen to minimize the effects of ambient lighting and provide high contrast images. Few, if any, sources of ambient light are located at positions located vertically below the center of a projection screen. The present inventor discovered that by placing a projector below the center line of the screen, such as on a table or on the floor, the projector would be located at a point from which very little ambient light originated. The projection screen 12 is therefore designed to direct the light in a vertical direction so as to maximize reflection from light originating from a point located vertically below the center of the screen. This has the effect of minimizing reflection from ambient light sources located at the side of or above the screen 12; that is, from ambient light sources located vertically at or above the center of the screen.

Figure 2:
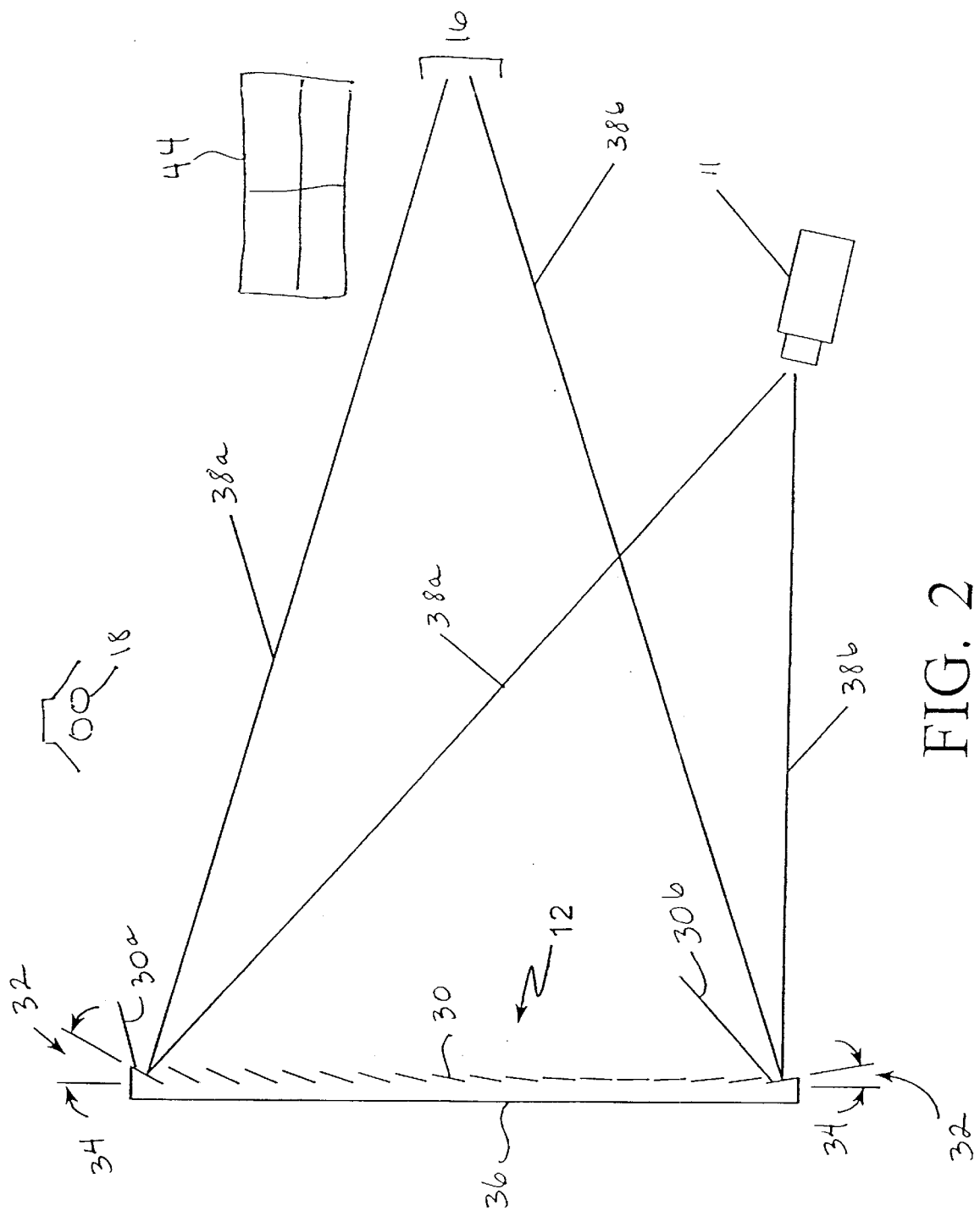
FIG. 2 is a schematic representation of a side elevation of a projection system.
Figure 3:
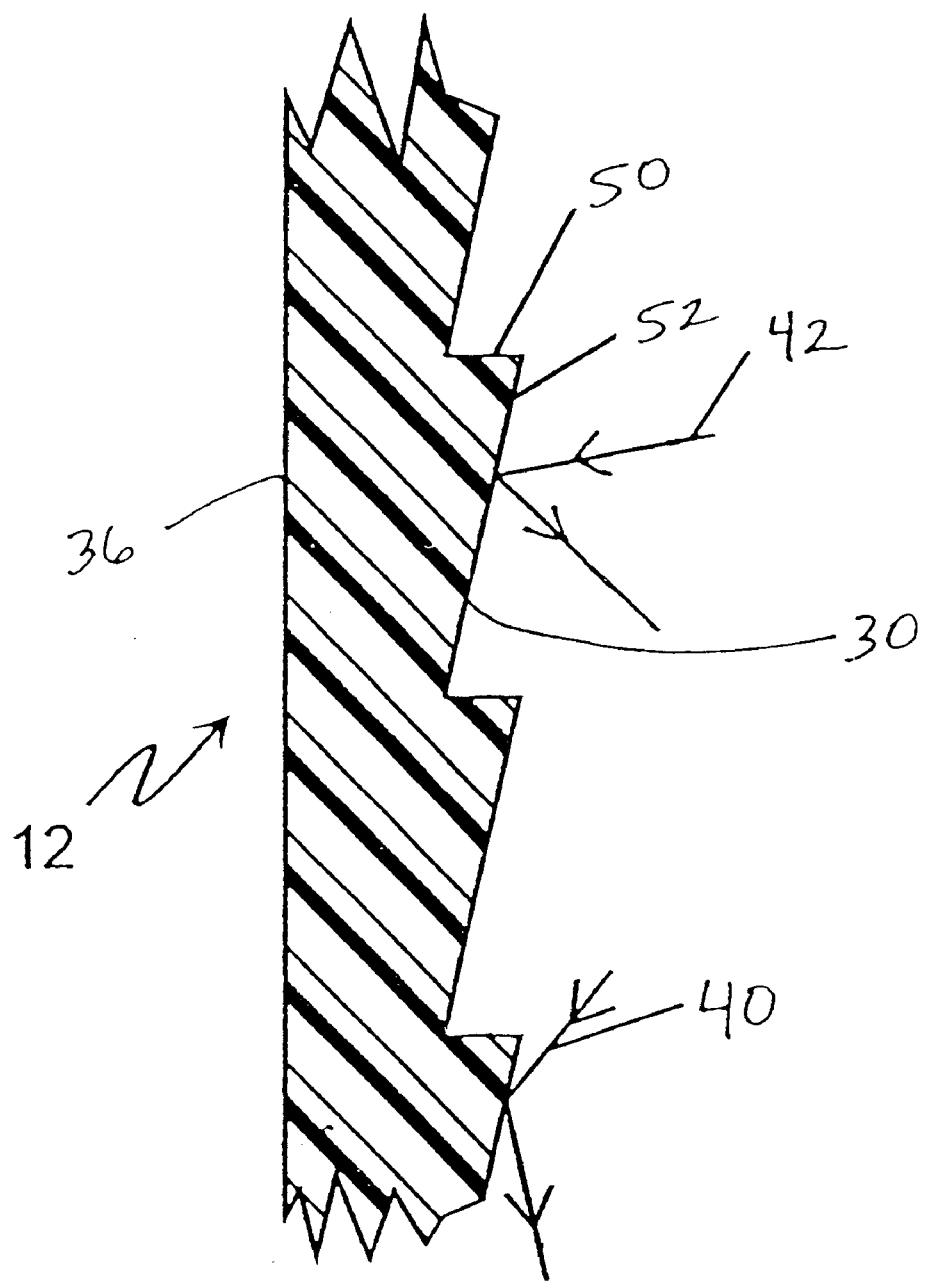
FIG. 3 is a portion of a vertical cross-section of a first embodiment of a projection screen taken along line A—A of FIG. 1.

Referring now more particularly to FIG. 2, the screen 12 of the present invention comprises a substantially planar surface 36 on which is disposed a plurality of substantially horizontal reflective row segments 30. Each of the row segments 30 defines a vertical angle of inclination 32 with respect to the vertical direction 34. For example, where the screen has a flat rear surface 36 that is located in the vertical plane, the angle of inclination may be taken as the angle with respect to the rear surface 36. Referring to FIG. 3, in vertical cross-section the screen 12 has a saw tooth appearance resulting from the substantially horizontal upper surfaces 50 and inclined vertical surfaces 52 of the horizontal row segments 30.

The angle of inclination for each row segment 30 is chosen so as to direct the light originating from the projector (or from a light source located below the center line of the screen) toward the viewing band 16. Uniformly increasing the respective angle of inclination 32 of the row segments 30 over the vertical dimension of the screen 12 from the bottom of the screen to the top of the screen permits the reflected light to be directed in a vertical direction to maximize the intensity of the image at the level of the viewers 14. A greater respective vertical inclination angle 32 for a row segment 30a at the top of the screen facilitates directing the projected light 38a to the level of the viewing band 16. A lesser or even negative respective vertical angle of inclination 32 for a row segment 30b in a lower region of the screen permits directing the projected light 38b toward the viewing band 16 even if the bottom of the screen 12 is below the eye level of the viewer.

In one exemplary system, the angle of inclination for segments at the top of the screen is about 19°, while the angle of inclination at the bottom of the screen is about −3°, with the angle of inclination increasing uniformly from the bottom of the screen toward the top of the screen. Using such a system, a projector located at floor level may project upward at a 6° angle toward a 6 foot high screen located about 14 feet away and mounted about 2 feet above the floor. Because the projector is projecting an image upwardly, it is preferred to use a digital projector having keystone correction.

By varying the angle of inclination 32 in this manner, it may be seen that ambient light originating from sources located at or above the center of the screen 12 is directed away from the viewing band 16. For example, referring to FIGS. 2 and 3, light 40 from overhead light source 18 is directed in a direction toward the floor. Ambient light 42 originating from a source such as a window 44 located near the level of the viewer is directed back toward the projector. The construction of the screen 12 thus reflects ambient light away from the viewing band 16, thereby maximizing the contrast of the projected image.

The screen of the present invention may also be used with projectors mounted above the screen. In these applications, the angle of inclination is varied from segment to segment to reflect light projected from above toward the viewing band. For example, the angle of inclination may have a large negative angle of inclination near the bottom of the screen and increase uniformly to a small positive angle of inclination near the top of the screen. The screen will continue to reduce the effects of ambient light located to the side of the screen, and will also reduce the effect of ambient light sources located below the screen, such as floor lamps.

The size and number of row segments 30 depends on the size of the screen and resolution of the projected image. Where a digital image is projected, it is desired to have more segments than pixel elements. Preferably, the number of row segments 30 is twice the number of pixel elements. For example, where the projected image has 768 vertical pixel elements, it is desired to provide at least 1536 row elements to produce a pleasing reflected image. Thus, for a 100 inch high screen, this results in a height for each row of about 1/16 inch (0.065 inches)

While a reflective surface provides high gain, limited diffusion of the reflected light may be desirable to provide uniformity of image brightness over the screen area. As a result, the row segment 30 may provide for diffusion of the reflected light in a limited solid angle around the specular direction of reflection. As illustrated in FIG. 1, light 20 incident to the top of the screen 12 is reflected to the vision zone 16 along lines 22a and 22b. Likewise, light incident to a lower region of the screen 24 is reflected to the vision zone 16 along reflection lines 26a and 26b representing the limited diffusion of light along the nominal direction of reflection. The system provides the further advantage of minimizing visual obstruction by locating the projector 11 out of the lines of sight of viewers 14. Locating the projector 11 below the line of sight is often necessary at trade show booths because the structure of a booth may not be sufficient for mounting the projector above the audience 14.

Figure 4:
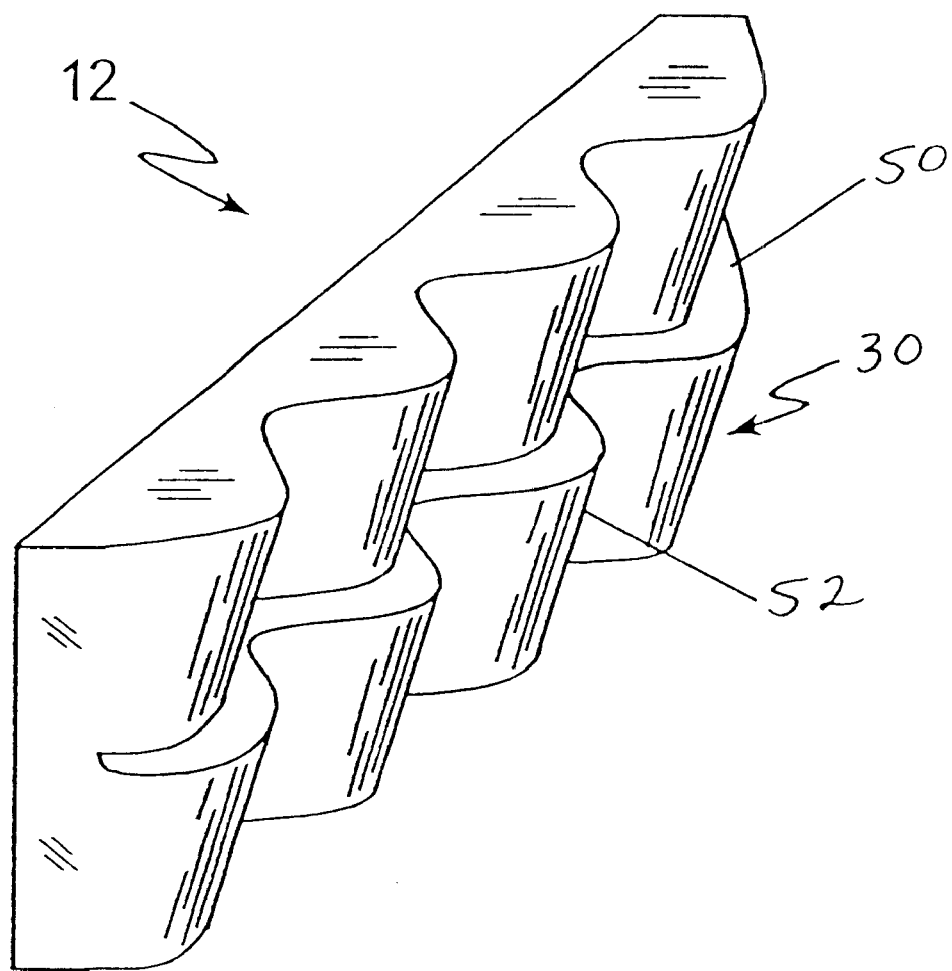
FIG. 4 is a perspective view of a section of a front surface of a projection screen having row segments including a curved surface of sinusoidal cross-section.
Figure 5A:
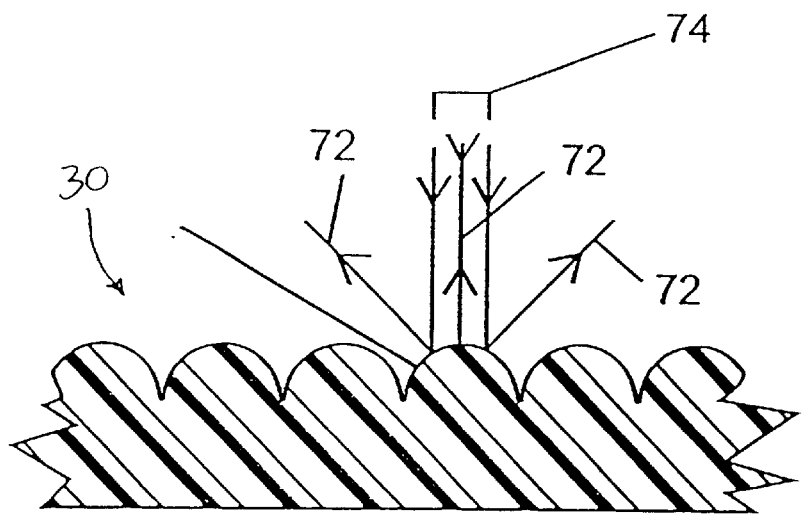
FIG. 5a is a portion of a horizontal cross-section of an alternative projection screen having row segments with a cross-section comprising adjacent circular arcs taken in direction B—B of FIG. 1.
Figure 5B:
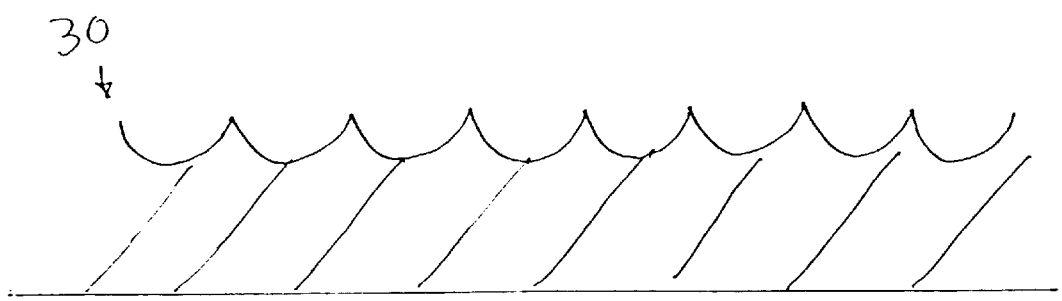
FIG. 5b is a portion of a horizontal cross-section of yet another alternative projection screen having row segments with a cross-section comprising adjacent circular arcs taken in direction B—B of FIG. 1.

A wide horizontal distribution of light may be provided in a number of ways. By wide horizontal distribution is meant that the light reflected by the screen 12 is distributed or diffused over a wide horizontal viewing angle. Preferably, the screen for any area smaller than the resolution of the projected image distributes the reflected light over a horizontal angle approaching 180°. In a first embodiment illustrated in FIGS. 3–4, each row segment 30 includes an upper surface 50 substantially normal to the plane of the screen 12 and a uniform repeating optical pattern on surface 52 oriented at the angle of inclination 32 to the screen 12. The inclined surfaces 52 of the horizontal row segments 30 comprise a uniform repeating optical pattern that distributes light widely over a horizontal direction. The inclined surface 52 of the screen element is nominally reflective and light striking the inclined surface 52 of a screen element 30 is reflected at an angle generally equal to the angle of incidence. When "rays" of incident light (indicated by a bracket) are reflected by the curved vertical face of the row segment, the light is distributed over a substantial horizontal angle. This is illustrated for an alternative embodiment shown in FIG. 5A, in which the "rays" of incident light 74 (indicated by a bracket) are reflected 72 by the curved vertical face 52 of the row segment 30 and distributed over a substantial horizontal angle. As a result, images projected on a screen 12 can be viewed by persons standing in a wide horizontal area in front of the screen. Three useful surface curvatures for the repeating optical patterns of the vertical faces 52 of the row segments 30 are a plurality of substantially adjacent circular arcs as illustrated in cross-section in FIGS. 5A and 5B and a substantially sinusoidal cross-section as illustrated in FIG. 4. The use of any of these surfaces will result in the horizontal distribution of light over a wide horizontal viewing angle.

The upper surface 50 may optionally be coated or textured so as to reduce reflection of ambient light toward the viewer. For example, in one embodiment, the upper surface 50 may be coated with a light absorbing material to absorb unwanted ambient light. Exemplary coating materials include black paint. Alternatively, the upper surface 50 may be textured by cutting grooves or sandblasting the surface so as to roughen the surface. By providing a light absorbing material, ambient light from above is absorbed and prevented from reflecting from the upper surface 50 toward a vertical surface 52 and then toward the viewer. Where the upper surface 50 is textured, light from above will be diffused by the textured upper surface 50, thus significantly reducing the amount of light reflected toward the vertical surface 52. In fact, coating or texturing the upper surface of a reflective element to reduce upward reflection of ambient light may be used with any screen having a plurality of reflective elements having vertically inclined surfaces, such as with the projection screen of Malifaud et al., U.S. Pat. No. 5,696,625, the disclosure of which is hereby incorporated by reference.

Figure 6:
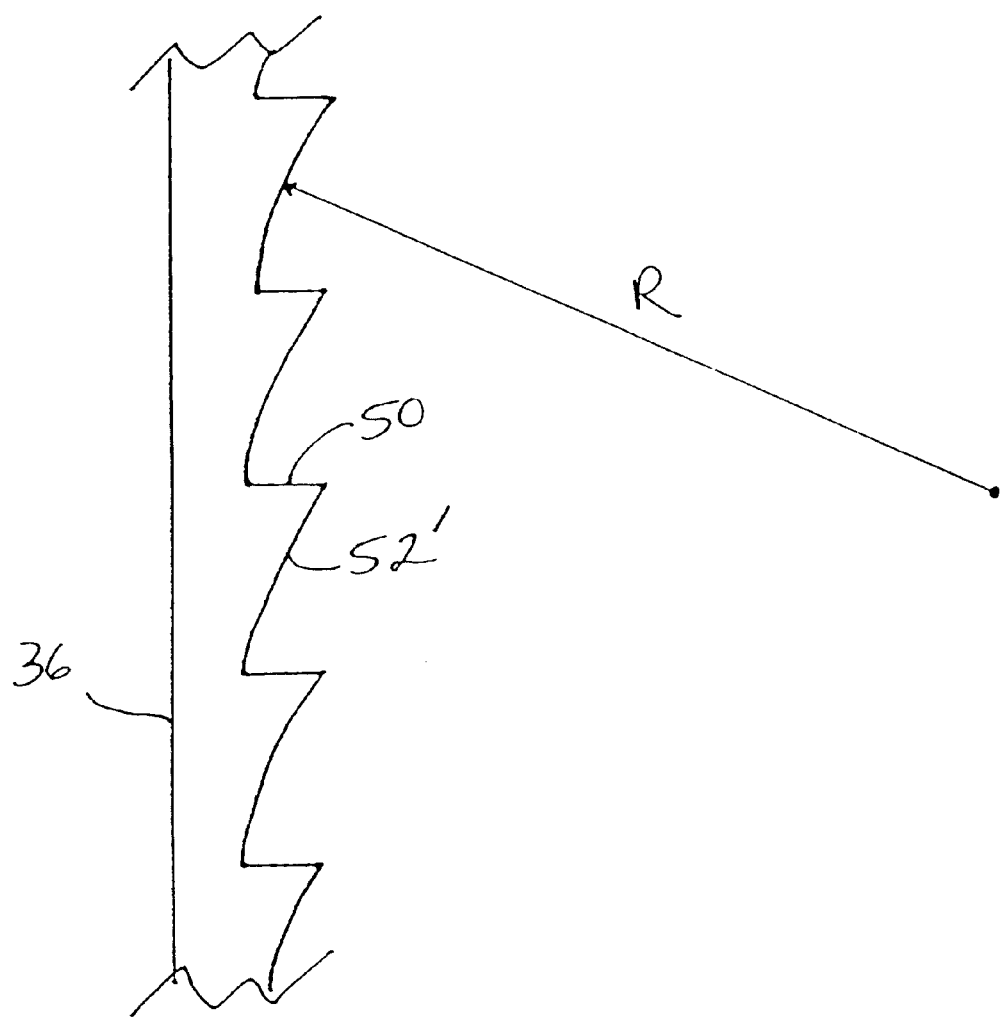
FIG. 6 is a portion of a vertical cross-section of a second embodiment of a front projection screen taken along line A—A of FIG. 1.
Figure 7A:
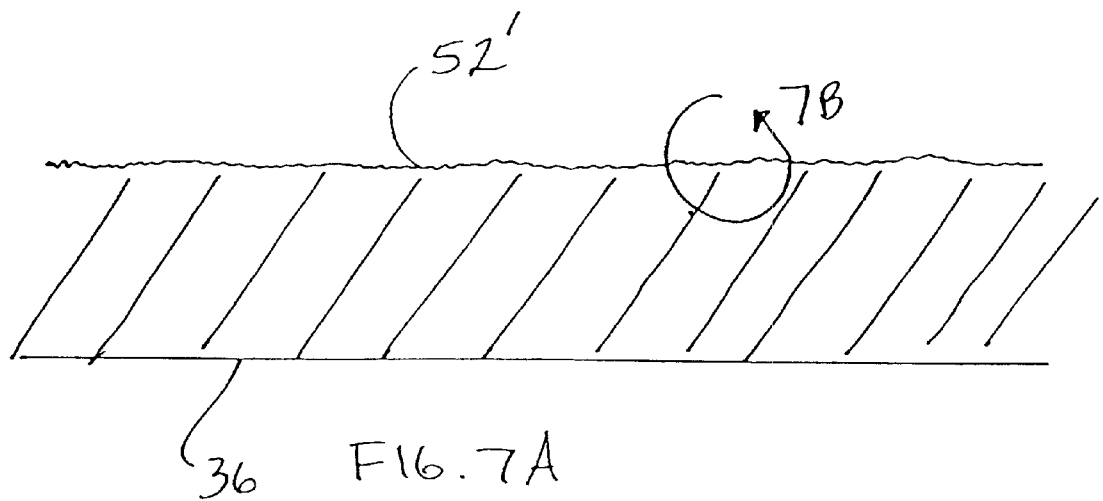
FIG. 7a is a portion of a horizontal cross-section of the second embodiment.
Figure 7B:
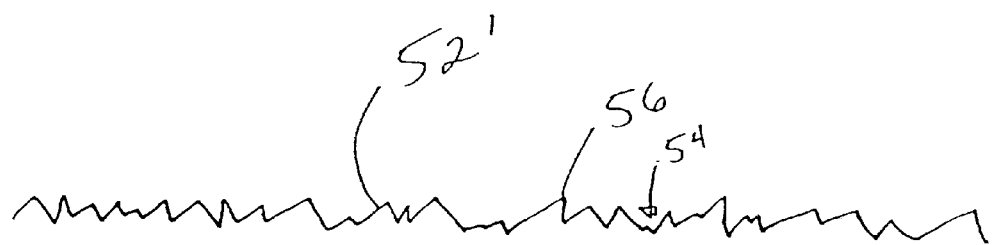

In another embodiment shown in FIGS. 6, 7A and 7B, the row segment 30 is formed by grinding the surface 52 in a vertical direction to produce a plurality of thin vertical grooves and ridges. FIG. 7A shows a horizontal cross section taken along the line B—B of FIG. 1, and FIG. 7B shows an exaggerated detail view. Very fine vertical grooves 54 and ridges 56 may be produced by grinding or cutting the material used to make the screen with a sandwheel or grinding wheel. The ridges and grooves are produced by grinding in a vertical direction the material used to form the screen. For example, where the screen is formed by pressing a die plate into a moldable material, the horizontal row segments may be formed by grinding the die plate. The resulting fine vertical grooves 54 and ridges 56 diffuse the light in the horizontal direction over a wide area. However, the grooves 54 and ridges 56 reflect light in a narrow vertical direction.

In yet another aspect of the invention, the inclined surfaces 52 may be curved vertically in order to control the vertical distribution of light. For example, the embodiment of FIGS. 6, 7A and 7B provides a further advantage where the grooves are produced using a grinding wheel. As shown in FIG. 6, the segments 30 each have a curved inclined surface 52'. The curvature of the surface 52' is equal to the radius of curvature R of the grinding wheel. The distribution of light in the vertical direction may be further controlled by selecting an appropriate radius of curvature R. The radius of curvature will determine the focal length of the surface. Thus, a small radius of curvature will yield a wide vertical distribution of light. The angle of inclination 32 of such a surface 52' may be taken as the tangent line at the midpoint of the inclined surface 52'. Similarly, for row segments having cross-sections like those shown in FIGS. 4, 5A and 5B, the inclined surface may be formed so as to provide a curved surface for controlling the distribution of light in a vertical direction.

The screen 12 can be constructed in a variety of fashions. In one method, the screen 12 is formed by pressing a die plate into a moldable material. The optical pattern for the screen is formed in a material such as aluminum. A single sheet of aluminum may be machined, or alternatively, a plurality of horizontal segments, corresponding to the horizontal row segments, may be machined and fastened together, to produce the die plate. The screen pattern may be formed in the aluminum by milling or grinding. The aluminum is then hardened using an anodizing process. The die plate is then pressed into a moldable material, such as polyurethane, to produce a screen panel. Any plastic material that will take a mold image may be used. The resulting screen panel is then coated with a reflective material, such as depositing aluminum on the screen panel using a vacuum deposition process.

In an alternative method, the die plate is used to form a mold into which a liquid may be poured. The liquid is poured into the mold and allowed to cool and harden, resulting in a cast image of the screen pattern.

When it is desired to coat or texture the upper surface 50, a plurality of horizontal row segments may be formed. Each upper surface 50 of each individual row segment is then coated or textured prior to fastening the individual row segments together. The row segments may be secured together to form the screen itself, or where the upper surface 50 is textured, used to form a mold for producing screens.

The screen 12 may be either made from a single panel or from multiple panels. The uniformity of the horizontal row segments 30 facilitates construction of the screen 12 from a plurality of smaller panels. The enhanced portability of the smaller screen panels is an important feature for screens used at trade shows and other temporary exhibitions. Such screen panels may be mounted to a portable frame.

As described above, the present system may be used in variety of environments where it is desired to project an image, such as at trade shows, conference rooms, theaters, etc. In an alternative embodiment shown in FIG. 8, a system is shown for use in an environment having the projector 11 located below the screen 12. A mirror 80 is used to reflect the image toward the screen 12.

Figure 12:
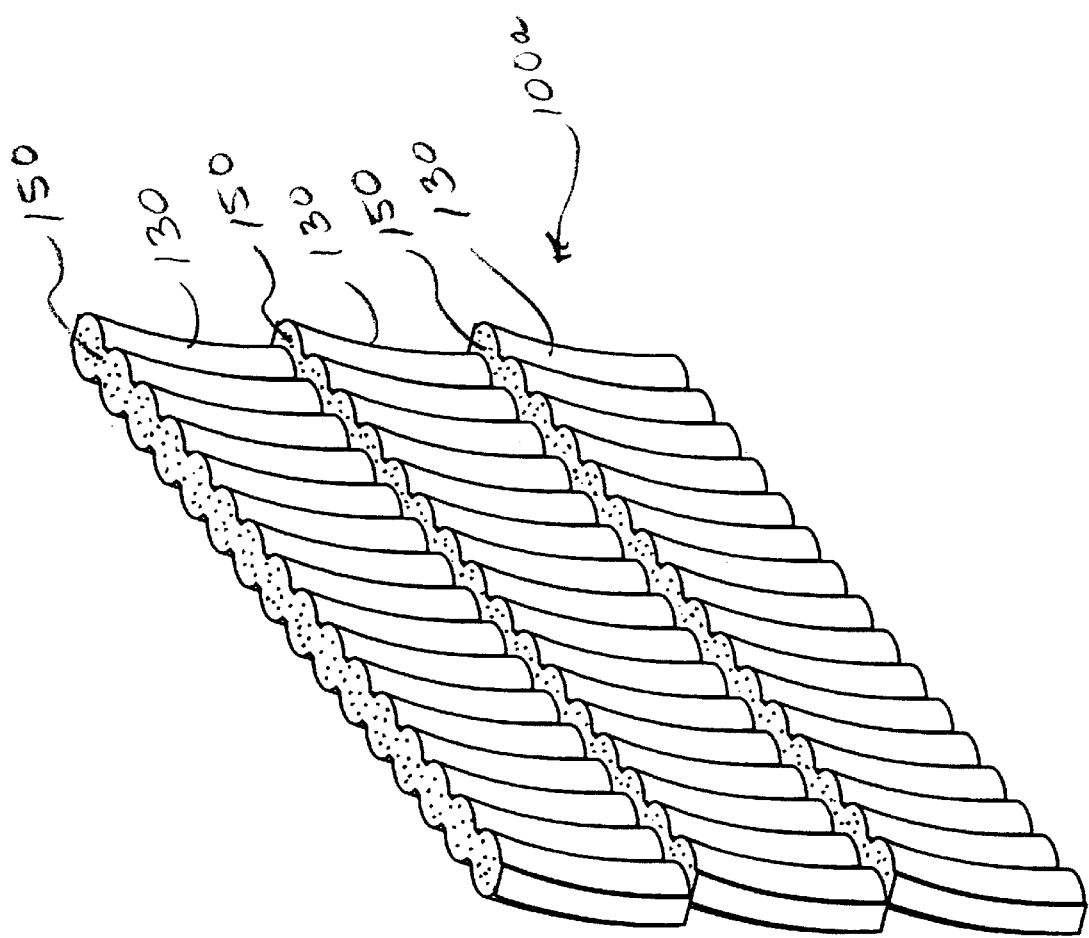
FIG. 12 shows a projection screen like that of FIG. 9 comprised of a plurality of horizontal row segments.

FIG. 9 shows another embodiment of a projection screen 100. In this embodiment, a plurality of vertically oriented light-transmitting rods 102 are assembled together to form a generally planar screen, or a portion of a screen. The rods 102 may be formed of any suitable light-transmitting material, such as glass or plastic. Preferably, the material is transparent and transmits almost all of the light entering the rods 102. The rods 102 may be assembled together by any conventional method. For example, the rods 102 may be adhered to one another, or may be secured in a frame that holds the rods together. Alternatively, the rods 102 may be molded together or otherwise assembled when partially molten so that the rods form a continuous screen (as illustrated by the screen of FIG. 12).

The size and number of rods 102 depends on the size of the screen and resolution of the projected image. Where a digital image is projected, it is desired to have more rods than horizontal pixel elements. Preferably, the number of rods is twice the number of pixel elements. For example, where the projected image has 1,024 horizontal pixel elements, it is desired to provide at least 2,048 rods to produce a pleasing reflected image. Thus, for a 100 inch wide screen, this results in a diameter for each rod of about 0.05 inch.

The rear surface 106 of the rods 102 is coated with a reflective material 104. The reflective material 104 may be a coating of aluminum, silver, reflective paint or any another reflective coating or material which may be adhered to the rear surface of the rods.

The projection screen 100 provides different reflection characteristics in the vertical and horizontal directions for the vertical and horizontal distribution of light. Referring now to FIG. 10a, which shows a side cross-sectional view of the screen 100, the vertical component of a light beam 110 striking the projection screen 100 is reflected as if striking a flat planar reflective surface. That is, the angle of reflection equals the angle of incidence. Thus, light projected from below the screen (as by a projector 111) is reflected upwards, while ambient light directed toward the screen from above (such as overhead lighting) is reflected downward.

In contrast, the screen 100 reflects light in the horizontal direction back toward the light source. The light may be said to be reflected in the horizontal direction along a path that is generally parallel to the horizontal path of incidence. (Of course, this ignores the vertical component). For example, referring more particularly to FIG. 10b, a light beam 112 which is projected directly from a point in front of the screen 100 is reflected back horizontally in the direction of the point in front of the screen. Likewise, another light beam 114 which is directed toward the screen 100 from a point at the side of the screen returns back toward the point at the side of the screen.

These light reflecting characteristics allow the projection screen 100 to diminish the effects of ambient light. A projector 111 located near or below the center line of the screen 100, and more preferably located near or below the bottom portion of the screen, and which is aimed upward will project light upward toward a viewing band. In contrast, ambient light from lights above the screen will be reflected downward toward the floor. With respect to ambient light from sources located at the side of the screen, such as a window, such ambient light will be reflected back in the horizontal direction toward the ambient light source. In contrast, light from the light source in front of the screen, namely the projector, will be reflected in front of the screen and toward the viewer.

The projection screen 100 of FIG. 9 may be modified to tailor the reflection characteristics of the projection screen. The vertical distribution of light may be controlled by imparting a vertical curvature to the rods 102. For example, referring to FIG. 11, the vertically disposed rods 102 are curved slightly in the vertical direction. This results in an inner screen surface 108' that is cylindrically concave. The result of providing such a concave, curved inner surface 108' with a large radius of curvature is to reflect the light toward the viewer, rather than upwards toward the ceiling when a floor mounted projector is used. In addition, the vertical distribution of light may be increased by texturing the rear surface of the rods 102. This results in diffusion of light from the reflective coating 104 on the rear surface, resulting in a wider distribution of light from the reflecting surface.

The horizontal distribution of light may also be modified. For example, instead of using right cylinder rods having a circular cross-section, rods having an elliptical or oval cross-section may be used to modify the distribution of light in the horizontal direction. Similarly, the use of a textured rear surface that results in the diffusion of light will also broaden the horizontal distribution of light.

Yet another embodiment utilizing the light-reflecting principals of the projection screen 100 of FIG. 9 is disclosed in FIG. 12. This projection screen 100a is comprised of a plurality of horizontal row segments 130. Each of the horizontal row segments 130 is vertically inclined. Like the embodiment of FIGS. 1–4, each of the row segments 130 defines a vertical angle of inclination with respect to the vertical direction. The angle of inclination for each row segment may be chosen so as to direct the light originating from a projector (or other light source) toward a viewing band. As in the embodiment of FIGS. 1–4, the respective angle of inclination of the row segments may be uniformly increased over the vertical dimension of the screen from the bottom of the screen to the top of the screen. In addition, as shown in FIG. 12, the inclined surfaces may be vertically curved (as in FIG. 11) using a small radius of curvature in order to widen the distribution of light into a broader vertical viewing band. FIG. 12 also shows that the upper surface 150 is textured to reduce reflection of light from the upper surface 150 to an adjacent vertical inclined surface of an adjacent row segment, and thus reduces the effect of reflected ambient light from the upper surface.

As in the embodiment of FIGS. 1–8, this screen may be used with a projector mounted above or below the screen. Thus, the angle of inclination may be varied as desired to reflect light from the projector to the viewing audience.

Figure 13:
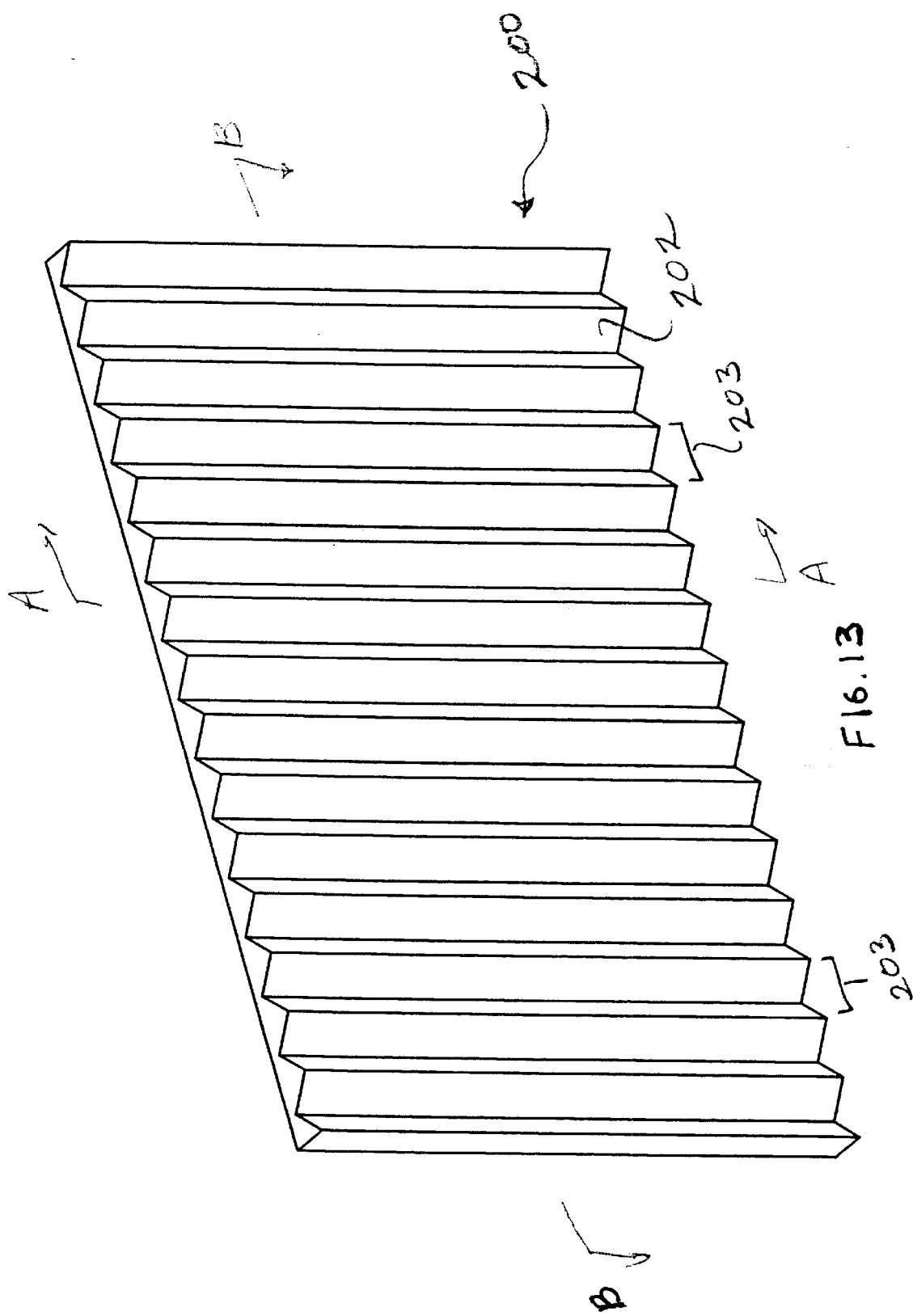
FIG. 13 shows yet another embodiment of a projection screen.

FIG. 13 shows yet another embodiment of the invention. In this embodiment, a projection screen 200 is provided having a plurality of reflective surfaces 202. The reflective surfaces 202 are generally planar, and vertically oriented. The reflective surfaces are arranged in pairs 203, so that each pair forms a generally v-shaped channel. The respective reflective surfaces of each pair define an included horizontal angle 204 between the two surfaces (see FIG. 14b). The included angle 204 is preferably 90°, but may vary by a few degrees. As shown in FIG. 14b, this results in a cross-section taken along a horizontal line that has a generally saw tooth appearance. The reflective surface may be a coating of aluminum, silver or other reflective material.

The size and number of reflective surfaces 202 depends on the size of the screen and resolution of the projected image. Where a digital image is projected, it is desired to have more reflective surfaces than horizontal pixel elements. Preferably, the number of reflective surfaces is twice the number of pixel elements. For example, where the projected image has 1,024 horizontal pixel elements, it is desired to provide at least 2,048 reflective surfaces to produce a pleasing reflected image. Thus, for a 100-inch wide screen, this results in a width for each reflective surface of about 0.05 inch.

The screen 200 of FIG. 13 has essentially the same light reflecting characteristics as the screen 100 of FIG. 9. Thus, the vertical component of light is reflected as if from a planar surface, as shown by the light beam 210 in FIG. 14a. That is, the angle of reflection equals the angle of incidence. In contrast, the horizontal component of light is reflected back in the horizontal direction toward the light source, as shown by the light beams 212 and 214 in FIG. 14b. Thus, the projection screen 200 of FIG. 13 also reduces the effects of ambient light just like the screen 100 of FIG. 9.

The projection screen 200 may be modified to like the projection screen 100 to tailor the vertical and horizontal distribution of light. With respect to reflection of light in the vertical direction, the vertically inclined surface may be curved in the vertical direction so as to create a concave inner surface 208. For example, FIG. 15 shows the projection screen 200 having a concave inner surface 208 to reflect light toward the viewing audience, rather than towards the ceiling when a floor mounted projector is used. Alternatively, the reflective surface 202 may be textured (such as by increasing the roughness of the reflective surface) so that the reflective surface diffuses light. This will result in a wider vertical distribution of light.

Figures 16A, 17, 18:
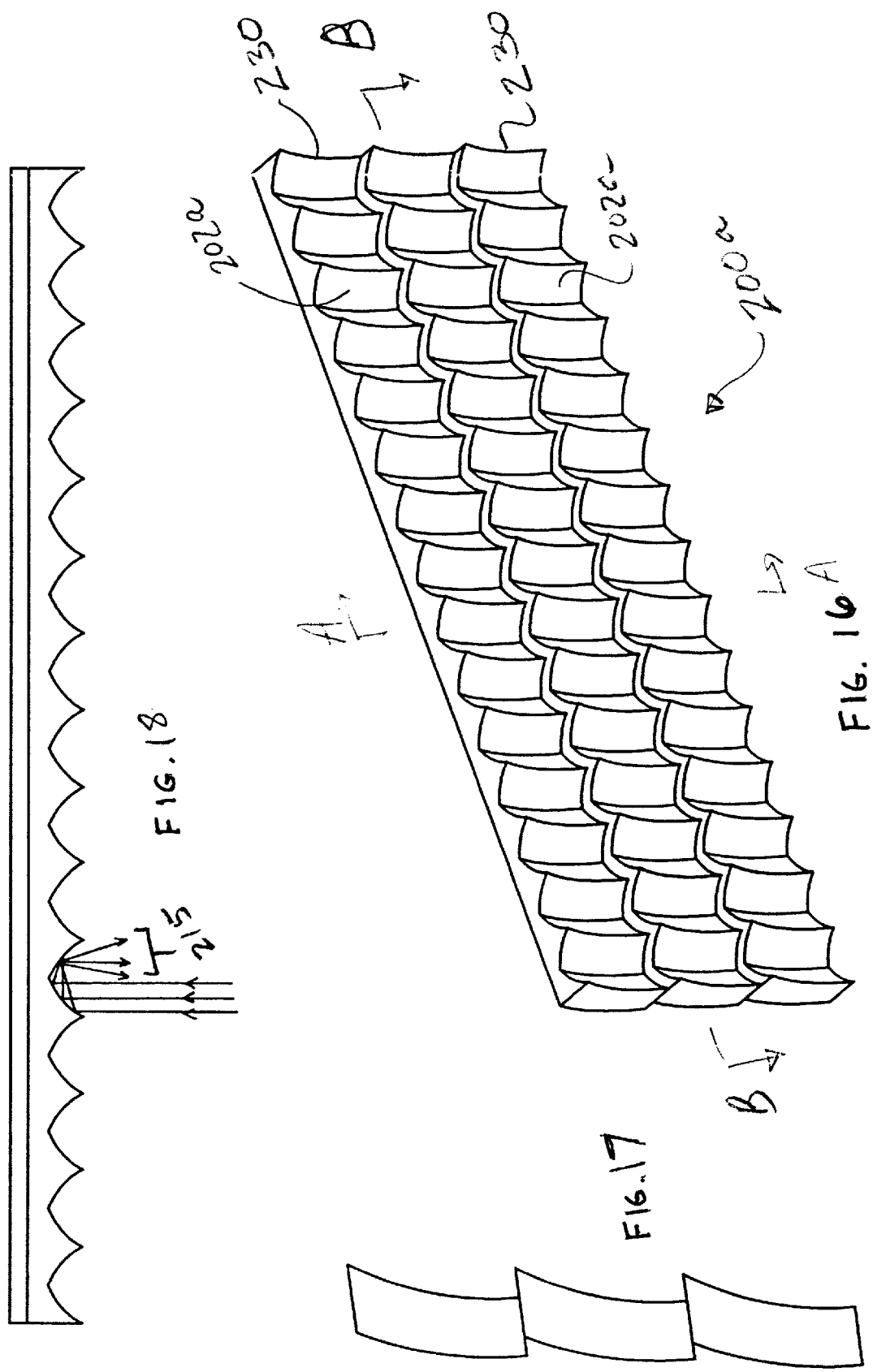
FIG. 17 is a cross-sectional view taken along the line A—A of FIG. 16 showing reflection of light in the vertical direction.
FIG. 18 is a cross-sectional view taken along the line B—B of FIG. 16 showing reflection of light in the horizontal direction.

With respect to reflection of light in the horizontal direction, the horizontal distribution of light may be modified by providing horizontal curvature to the reflective surface 202. For example, FIG. 18 shows a cross-sectional view like that shown in FIG. 14b, except that the reflective surfaces 202 have been modified to be slightly curved in the horizontal direction. Reflected light is now distributed in a wider horizontal angle, as shown by the light beams 215 in FIG. 17. While the horizontally curved reflective surface shown in FIG. 17 is concave, alternatively the surface could be convex.

FIGS. 16 to 18 show yet another embodiment of a projection screen 200a which is based on the projection screen 200 shown in FIG. 13. The projection screen 200a of FIG. 16 is comprised of a plurality of horizontal row segments 230. Each of the horizontal row segments 230 has a plurality of reflective surfaces 202a like those in FIG. 13. The inclined vertical surfaces of each of the horizontal row segments 230 are inclined with respect to the vertical dimension, as in the embodiment of FIGS. 1–4 and the embodiment of FIG. 12. With respect to the embodiment of FIG. 16, this particular embodiment has reflective surfaces 202a which are curved in both the horizontal and vertical direction, as shown in FIGS. 17 and 18 respectively. This results in a broader distribution of reflected light in the vertical direction, and a broader distribution of light in the horizontal direction, relative to the screen 200 of FIG. 13.

FIGS. 19 and 20 show yet another embodiment of a projection system 300 of the present invention which is used for projecting a three dimensional image. In this projection system, two projectors 302 are employed. As shown in FIG. 19, the two projectors are located vertically at or near the bottom of the screen, so as to reduce the effects of ambient light from above the screen. Preferably, the two projectors 302 are side-by-side, as shown in the top view of FIG. 20. The projectors are preferably relatively close together, preferably about one foot or less, and more preferably about 2.5 inches (the spacing between the viewer's eyes), so as to reproduce a respective pair of images. The two projectors are used to project two difference images taken by two cameras located about 2.5 inches apart from one another. While FIG. 19 shows the projectors mounted below the viewer, the projectors may be located above the viewer.

The screen 304 of the projection system of FIGS. 19–20 may be any of the projection screens of FIGS. 9–18 described herein. The screen reflects light vertically such that the projectors may be mounted above or below the line of sight of the viewer. However, the screen should provide a narrow horizontal distribution of light, so that a viewer can see only one of the two images with each eye. That is, when the viewer stands in front of the center of the screen, the right eye of the viewer perceives one image projected by one projector, and the left eye perceives the other image projected by the other projector. When the viewer stands in front of the screen and perceives the two images simultaneously, the viewer will perceive one three-dimensional image.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A projection screen defining a horizontal direction and a vertical direction, comprising a panel, said panel having a front and a rear surface, the front surface formed of a plurality of vertically oriented rod segments comprised of parallel surfaces defining pairs of vertically oriented reflective surfaces, the reflective surfaces of each of said pairs forming a plurality of substantially V-shape channels, said rod segments being arranged in a plurality of horizontal rows of predetermined vertical lengths, each said row of said rod segments having a predetermined angle of inclination with respect to a vertical plane.

2. The projection screen of claim 1 wherein said panel has an overall concave curvature in the vertical plane.

3. The projection screen of claim 2 wherein the rear surface of the panel has a textured surface.

4. The projection screen of claim 1 wherein the rod segments have a cylindrical cross-section.

5. The projection screen of claim 1 wherein the rod segments have horizontally flat surfaces.

6. The projection screen of claim 1 wherein the rear surface is substantially planar and is coated with a reflective material.

7. The projection screen of claim 1 wherein the rod segments have an oval cross-section.

8. The projection screen of claim 1 wherein said horizontal rows define upper surfaces, said upper surfaces having a roughened surface texture.

9. A projection screen defining a horizontal and vertical direction comprising a panel having a front and a rear surface, said front surface formed of a plurality of vertically oriented rod segments defining pairs of vertically oriented reflective surfaces, said reflective surfaces forming a plurality of pairs of substantially V-shaped channels, said rear of said panel being substantially smooth and having a reflective coating, said panel having an overall concave curvature.

10. The projection screen of claim 9 wherein said rod segments are arranged in horizontal rows, each row having a predetermined angle of inclination with respect to the vertical direction.

11. The projection screen of claim 10 wherein said panel has a top and a bottom, wherein said angle of inclination of each horizontal row generally increases from the bottom of said panel to the top of said panel.

12. The projection screen of claim 9 wherein said rod segments have a circular cross-section.

13. The projection screen of claim 9 wherein said rod segments have an oval cross-section.

14. The projection screen of claim 9 wherein said rod segments have an A-shaped cross section.

* * * * *